Figure 1:
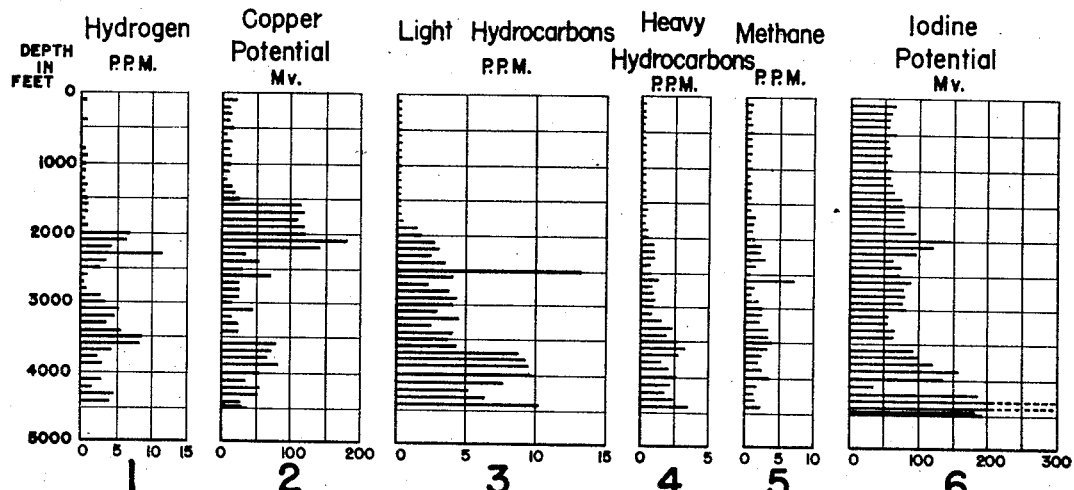

Oct. 23, 1945.   C. R. HOCOTT   2,387,513
WELL LOGGING
Filed Aug. 8, 1941

Claude R. Hocott INVENTOR.
BY P. J. Whelan
ATTORNEY

Patented Oct. 23, 1945

2,387,513

UNITED STATES PATENT OFFICE 2,387,513

WELL LOGGING

Claude R. Hocott, Houston, Tex., assignor to Standard Oil Development Company, a corporation of Delaware Application August 8, 1941, Serial No. 406,008

9 Claims. (Cl. 204—1)

The present invention is directed to a method for logging wells, of the type generally referred to as geochemical.

It has already been proposed to log wells drilled for oil by measuring the variation of the concentration of different selected substances with depth, and determining from the patterns produced the probability of oil being present in a subterranean formation, and the depth of the oil bearing formation usually in advance of the arrival of the bit at the formation. Other information can be obtained from such logs, such as the location of gas bearing formations and the variation in depth of a given formation over a given area. That is to say, these logs are useful for correlation purposes over an area being developed.

Among the substances utilized for geochemical logging purposes have been hydrocarbons, both light and heavy, various mineral constituents, free metals and metals in the -ous state of combination which are also capable of existing in the -ic state of combination. These logs are ordinarily prepared by collecting samples of cuttings which includes samples of drilling mud containing the cuttings, at successive depths along the bore hole during the drilling operation, and analyzing these samples for their content of the selected constituent. The concentrations of the selected constituent are then plotted on a chart against the depth of the samples, with the result that a log of more or less characteristic pattern is obtained. In each of the cases mentioned, a chemical analysis of a micro nature is preferred for accurate results.

As an outgrowth of surface prospecting work involving the determination of the effect of hydrocarbon consuming bacteria on hydrocarbon gases emanating from the earth, it has heretofore been proposed to measure the reduction-oxidation characteristics of surface samples. It has been found possible by making these measurements to produce surface maps conforming in general with the maps obtained by measuring the hydrocarbon consuming bacterial content of spaced surface samples and organic products resulting from bacterial action contained in these samples. It has been assumed, therefore, that the bacterial action results in a reducing condition in the soil. These bacteria are aerobic and are not found very deep below the surface of the soil. Accordingly, it was to be assumed that the reduction-oxidation characteristics were of interest only for surface prospecting.

According to the present invention, well logs are made by measuring the effect of cuttings obtained at successive depths in the bore hole on the potential of an oxidation-reduction system. These cuttings are preferably removed from the drilling mud, crushed and added to an oxidation-reduction system, which is opposed to a standard half cell across a potential measuring device. If desired, the drilling mud itself containing the cuttings can be filtered and used in the same way as the cuttings. It may be mentioned that it is undesirable to retain any substantial quantity of the aqueous medium of the drilling fluid in the sample used for fabricating the half cell. As is well known, it is readily possible to determine the depth from which cuttings obtained during drilling were derived. There is a well known formula for determining the lag in time between the time the cutting is removed from the formation by the drill bit and the time it arrives at the surface. This formula may be found at page 68 of Petroleum Production Methods by John R. Suman, 3rd edition, published in 1923 by the Gulf Publishing Co. of Houston, Texas. It is also reproduced at page 108 of Bulletin #201 of the Bureau of Mines entitled Prospecting and Testing for Oil and Gas, published in 1922 by R. E. Collom.

Any well known oxidation-reduction system can be used for the practice of the present invention. An oxidation-reduction system is one which exhibits an oxidation-reduction potential when connected to one terminal of a potentiometer, the other terminal of which is connected to a standard half cell, such as a calomel half cell. Many such systems are known. Reference will be made to an oxidation-reduction system made up of a copper electrode in copper sulfate and the potential measurement when a soil sample is added to such a system will be referred to hereinafter, for the sake of simplicity, as the copper potential of the soil sample. Another oxidation-reduction system which will be discussed hereinafter is a solution of iodine in which is immersed an inert electrode, such as a platinum electrode. For the sake of simplicity, the potential measured when a soil sample is mixed with this system will be referred to hereinafter as the iodine potential of the soil sample. Other oxidation-reduction systems will be referred to hereinafter, and it is to be borne in mind that any such system including one made up of water plus the soil sample itself in which is immersed an inert electrode, such as a platinum electrode, can be employed.

It is to be understood that the type of log obtained differs with different systems, but all of these logs produce significant patterns. For example, the copper potential of the cuttings produces a log having a general similarity to the so-called hydrogen log, which actually is a log of the hydrogen produced by treating cuttings with an acid capable of reacting with free iron to generate hydrogen. The iodine potential, on the other hand, bears a general similarity to the log produced by measuring the hydrocarbon content of the cuttings. In the former case, namely the copper and hydrogen, the maximum values are usually found at a considerable distance above the producing formation, and there is a decrease in value as the formation is approached, while in the latter case, the iodine and hydrocarbons, there is a gradual increase in concentration as the formation is approached, the maximum being reached in the formation itself.

In measuring the copper potential, the crushed cuttings are mixed with a solution of copper sulfate of selected concentration. A copper electrode is placed in the solution and connected to one terminal of a potentiometer. The other terminal of the potentiometer is connected to a standard calomel half cell. After the potential difference between the two is read the half cell containing the cuttings is replaced by a cell containing copper sulfate solution of the same strength as that to which the cuttings were added, and a copper electrode, and the difference in potential between this half cell and the calomel half cell is measured. The difference between the two potential differences is then taken as the significant figure. It will be understood that with a suitable bridge the half cell containing the cuttings could be opposed against the blank copper sulfate half cell, but because a very satisfactory bridge for use with calomel half cells is available it is preferred to refer all measurements to a calomel half cell.

For producing a given well log, the same amount of cuttings is taken for each depth. Likewise, the copper sulfate solution should be the same for all observations. It is preferred to use dilute solutions of copper sulfate, such as a hundredth molar, or less. The same amount of the solution is used for each sample of cuttings and for the blank.

In the practice of the present invention by the use of the iodine potential a similar procedure is followed. A standard solution of iodine in water of about a thousandth molar concentration or less, is made up. Each sample of cuttings is mixed with this solution and a platinum electrode is immersed in the solution and connected to one terminal of a potentiometer, to the other terminal of which is connected a standard calomel half cell. After the difference in potential is read, the cell containing the cuttings is replaced by a blank iodine cell containing the standard solution and a platinum electrode which is connected to a potentiometer. Again, the difference in potential is read. The difference between the two potential readings is taken as the significant figure.

Other oxidation-reduction systems which may be used in the practice of the present invention are those made from bismuth salts, bromine, silver salts, chlorine, and the like. When a metal salt is used it is preferred to use that metal as the electrode. When the cell contains a solution of chlorine, bromine, or the like, a platinum electrode is preferred.

Cuttings can be collected with any desired frequency. A distance of 30 feet between the samples has been found to be satisfactory, even in wildcat wells. For wells drilled in known areas, it is usually sufficient to collect samples at every 100 feet. Usually, about two grams of cuttings is a satisfactory sample for the practice of the present invention. With this amount of cuttings 5 cc. of solution is used to make up the half cell. Of course, the amount of cuttings employed and the amount of solution employed may be varied at will so long as they are maintained the same for any given well.

Figure 2:
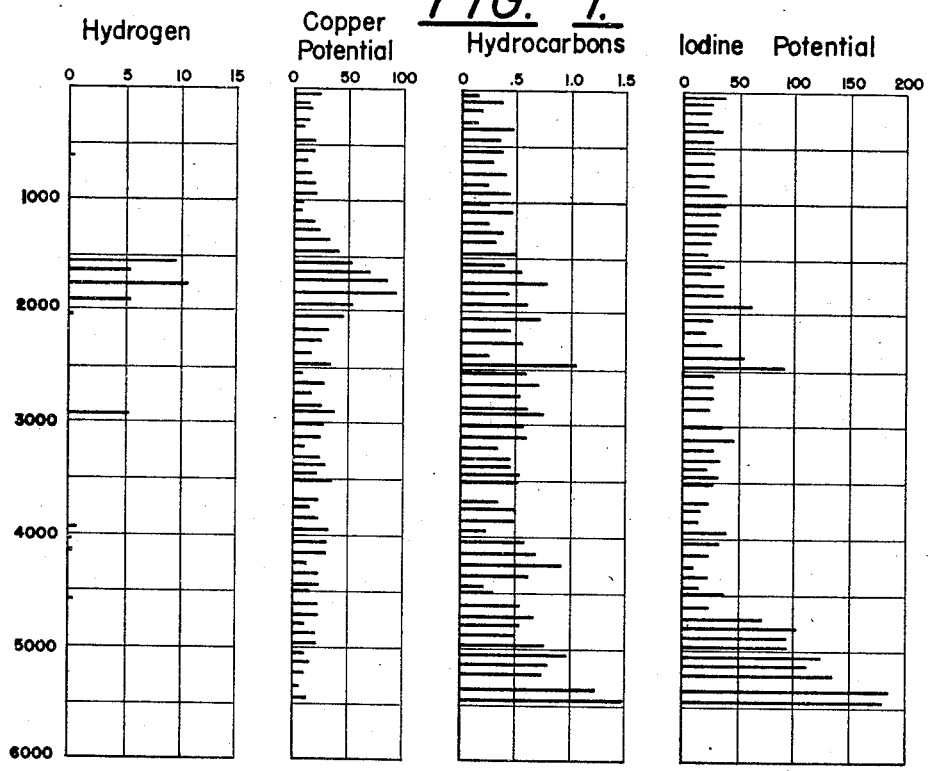

The nature of the results obtained by the practice of the present invention will be better understood from the following detailed description of the accompanying drawing in which Fig. 1 is a series of well logs made of a given well based on different constituents of the cuttings; and Fig. 2 is another series of logs made of a different well based on different constituents of the cuttings.

Referring to Fig. 1 in detail, numeral 1 designates a hydrogen log, numeral 2 a copper potential log, numeral 3 a log of light hydrocarbons (ethane through hexane), 4 a log of heavy hydrocarbons (heptane and heavier), 5 a log of the methane content of the soil, and 6 designates a log of the iodine potential. In making these logs, cuttings were collected at about every one hundred feet.

The hydrogen log was prepared by treating the cuttings with phosphoric acid and measuring the hydrogen evolved in terms of parts per million by weight of the cuttings. The copper potential log was made in the manner heretofore described. The various hydrocarbon logs were made by treating the cuttings with acid and sucking off the gases evolved while heating the cuttings, isolating different hydrocarbon fractions from the resulting gas by refrigeration and measuring the various fractions in parts per million by weight of the soil. The iodine potential log was made in the manner heretofore described.

The well of which this set of logs was prepared produced at a depth of 4500 feet. It will be noted that in the hydrogen log there is a peak at about 2300 feet while in the copper potential log there is a peak at about 2100 feet. In each log the values thereafter decrease with depth until in the hydrogen log a second high is found at about 3500 feet, while in the copper potential log a second high was found at about 3600 feet. The copper potential then decreased substantially uniformly to the producing depth.

The light hydrocarbons, aside from one isolated high value at 2500 feet, increase more or less gradually from 2000 feet to the production depth. The heavy hydrocarbons followed a fairly uniform increase from about 2000 feet to the production level. It will be seen that the iodine potential, beginning at about 3500 feet, began to rise and reached its maximum at the production level. Thus, the iodine potential was increasing while the copper potential was decreasing.

In Fig. 2, numeral 7 designates a hydrogen log, numeral 8 a copper potential log, 9 a total hydrocarbon log (ethane and heavier), and 10 designates an iodine potential log. It will be seen that the copper potential high occurred at just below 1800 feet while the hydrogen high occurred just above 1800 feet. The copper potential then decreased more or less uniformly to a low value at the level of production, which was about 5500 feet. The iodine potential, on the other hand, aside from a few sporadic high values, remained more or less uniform until at a depth of 4700 feet a positive increase with depth occurred, the maximum being reached at the production level.

In the foregoing description reference has been made specifically to well logging. Surface prospecting can also be performed by the method of this invention. For example, samples collected at from 12 to 100 feet below the surface at laterally spaced points over an area yield data by measurements of the type described from which profiles can be drawn indicating the location of petroliferous deposits. In carrying out such a survey it is desirable to collect all of the samples at the same depth, although where this is impossible by reason of terrain or subsurface conditions, a variation in collection depth may be tolerated. Surface maps are prepared by spotting sample locations on a map, drilling auger holes to the desired depth at the designated locations, collecting samples from the bottoms of such holes, measuring their potentials by one of the methods heretofore described, and correlating the measurements so made with the sample locations on the map. Iso-potential lines are then drawn on the map in the same way that depth contour lines are drawn on a reflection seismic map. In the usual case, this procedure will result in the drawing of a halo around the area overlying a petroliferous deposit where the latter is present. Maps of this type are well known and are illustrated in article entitled On geochemical prospecting by Leo Horvitz in vol. 4, No. 3, July 1939, of Geophysics.

The nature and objects of the present invention having been thus described and illustrated, what is claimed as new and useful and is desired to be secured by Letters Patent is:

1. A method for logging wells drilled for oil which comprises collecting samples of the formations traversed at successive depths during the drilling operation, mixing each sample with an identical solution of a salt forming the electrolyte of a half cell in which is immersed an electrode of the metal of the salt, the potential of said cell being sensitive to the addition of a minute quantity of a reducing component to said electrolyte, and comparing the potential of the resulting mixture with the potential of the identical half cell without the formation sample, whereby the results of such comparisons can be correlated with sample depth.

2. A method for logging wells drilled for oil which comprises collecting samples of the formations traversed at successive depths during the drilling operation, determining the effect of a measured amount of each of said samples on the potential of a reversible oxidation-reduction system, identical for each sample, the potential of which is sensitive to the addition of a minute quantity of a reducing component to said system, and correlating the effects determined with sample depths.

3. A method for logging wells drilled for oil which comprises collecting samples of the formations traversed at successive depths during the drilling operation, incorporating a measured amount of each sample in a copper-copper sulphate half cell, there being for each sample a half cell of known and identical potential which is sensitive to the addition of a minute amount of a reducing component thereto, determining the effect of each soil sample addition on the potential of the half cell to which it is added, and correlating the determined effects with sample depths.

4. A method for logging wells drilled for petroleum which comprises collecting samples of the formations traversed at successive depths during the drilling operation, adding a measured amount of each sample to a half cell comprising a platinum electrode immersed in an aqueous solution of iodine of a concentration not more than about a thousandth molar, there being a separate identical half cell for each sample, determining the effect of each sample on the potential of the half cell to which it is added, and correlating the determined effects with sample depths.

5. A method for logging wells drilled for oil which comprises collecting samples of the formation traversed at successive depths during the drilling operation, incorporating a measured amount of each sample into a half cell the potential of which is sensitive to the addition of a minute amount of a reducing component thereto, there being a separate identical half cell for each sample, and comparing the potentials of the half cells so modified with their potentials before modification, whereby the comparisons so made can be correlated with sample depths.

6. A method for logging wells drilled for oil which comprises collecting samples of the formations traversed at successive depths during the drilling operation, incorporating the same measured amount of each sample into a half cell, there being an identical half cell for each sample, all of said half cells being of the same potential and the potential thereof being sensitive to the addition thereto of a minute amount of a reducing component, comparing the potentials of the half cells so modified with their normal potentials, and correlating the results of such comparisons with sample depths.

7. A method according to claim 6 in which the half cell employed is a copper-copper sulphate half cell.

8. A method according to claim 6 in which the half cell employed is a half cell comprising a platinum electrode immersed in an aqueous solution of iodine of a concentration not more than about a thousandth molar.

9. A method for producing a well log comprising collecting the samples of the formations traversed at successive depths during the drilling operation, determining the effect of a measured amount of each of said samples on the potential of a reversible oxidation-reduction system the potential of which is sensitive to the addition of a minute quantity of a reducing component to said system and is identical for each sample, and preparing a chart by correlation of the determined effects with the depths from which the samples came.

CLAUDE R. HOCOTT.